(12) United States Patent
Schou

(10) Patent No.: US 7,220,441 B1
(45) Date of Patent: May 22, 2007

(54) METHOD AND A PACKAGING FOR PACKAGING AND FREEZING FOOD SUBSTANCES

(75) Inventor: Roar B. Schou, Rønne (DK)

(73) Assignee: Beck Pack Systems A/S, Ronne (DK)

( * ) Notice: Subject to any disclaimer, the term of this patent is extended or adjusted under 35 U.S.C. 154(b) by 327 days.

(21) Appl. No.: 10/018,792

(22) PCT Filed: Jun. 23, 2000

(86) PCT No.: PCT/DK00/00337

§ 371 (c)(1),
(2), (4) Date: Apr. 12, 2002

(87) PCT Pub. No.: WO01/00050

PCT Pub. Date: Jan. 4, 2001

(30) Foreign Application Priority Data

Jun. 24, 1999 (DK) ............................... 1999 00906

(51) Int. Cl.
*A23L 3/00* (2006.01)

(52) U.S. Cl. ...................... 426/392; 426/393; 426/396; 426/410; 426/516; 426/524; 53/435; 62/341

(58) Field of Classification Search ................ 426/392, 426/393, 396, 410, 411, 414, 415, 129, 643, 426/512, 513, 516, 518, 524; 53/435, 452, 53/458, 484, 513, 517, 122, 467, 249, 377.2, 53/376.3; 62/341
See application file for complete search history.

(56) References Cited

U.S. PATENT DOCUMENTS

| | | | | |
|---|---|---|---|---|
| 1,953,520 A | * | 4/1934 | Vogt ............................... 62/60 |
| 2,827,383 A | * | 3/1958 | Gorton ........................ 426/282 |
| 3,118,590 A | * | 1/1964 | Irving et al. ................. 229/186 |
| 3,464,833 A | * | 9/1969 | Mayo .......................... 426/393 |
| 3,602,422 A | * | 8/1971 | Dewhurst .................... 426/124 |
| 4,052,836 A | * | 10/1977 | Shaw ........................... 53/428 |
| 4,442,741 A | * | 4/1984 | Whittingham et al. .......... 83/80 |
| 4,907,421 A | * | 3/1990 | Battistella ..................... 62/341 |
| 4,919,951 A | * | 4/1990 | Jensen et al. ................ 426/241 |
| 6,351,927 B1 | * | 3/2002 | Righele et al. ................ 53/517 |

FOREIGN PATENT DOCUMENTS

| | | |
|---|---|---|
| CA | 1195162 A | 10/1985 |
| DE | 3729514 A1 | 3/1988 |
| EP | 0 225 037 A2 | 6/1987 |
| JP | 61015669 A * | 1/1986 |
| JP | 08196196 A * | 8/1996 |
| JP | 10129610 A * | 5/1998 |
| NO | 79718 | 2/1952 |
| SE | 451 372 | 10/1987 |
| WO | WO 96/02422 A1 | 2/1996 |
| WO | WO 97/06064 A1 | 2/1997 |
| WO | WO 97/11890 A1 | 4/1997 |
| WO | WO 98/07327 A1 | 2/1998 |

* cited by examiner

*Primary Examiner*—Leslie Wong
(74) *Attorney, Agent, or Firm*—Oliff & Berridge, PLC

(57) ABSTRACT

A method of packaging and freezing food substance comprising shaping of a plate of unfrozen food substance and subsequent packaging and freezing of the unfrozen plate of food substance, and wherein a carton packaging is used for packaging the unfrozen plate of the food substance that comprises a substantially rectangular bottom panel with two opposed, long side panels and two opposed, short end panels and a substantially rectangular cover panel, wherein the cover panel and the bottom panel are preferably connected to each other via one of the short end panels; wherein the unfrozen plate of food substance is arranged directly on the bottom face of the carton packaging, following which the cover panel of the carton package is closed over the bottom panel, such that the unfrozen plate of food substance is enclosed completely by the bottom panel, cover panel and side panels of the carton packaging, and following which the carton packaging containing the unfrozen plate of food substance is arranged in a freezer with a view to freezing the plate of food substance whereby the carton packaging is frozen onto the plate of food substance.

6 Claims, 2 Drawing Sheets

METHOD AND A PACKAGING FOR PACKAGING AND FREEZING FOOD SUBSTANCES

The present invention relates to a method for packaging and freezing food substances, comprising shaping of a plate of unfrozen food substance and subsequent packaging and freezing of the unfrozen plate of food substance. The invention also relates to a packaging of the block-carton type adapted especially for the method corresponding to the present invention.

In particular in connection with the packaging and freezing of relatively homogenous fish substances, such as Surimi or the like fish products, the above-mentioned method is widely used today. The know method takes place for instance by the unfrozen food substance being extruded and cut off in plates that are subsequently filled into a plastics bag that is positioned in a freezing frame that consists of a bottom and four side faces. Following positioning of the unfrozen plate of fish substance in the freezing frame, it is positioned in a plate freezer whereby the plate of unfrozen fish substance is frozen while in the freezer tray. In this case it is one of the objects of the plastics bag to ensure that the plate of fish substance does not freeze onto the freezer plates of the plate freezer, and likewise the plastics bag is to protect the foodstuff against drying out, rancidity and "freeze burn".

The freezer tray is subsequently removed from the plate freezer and the plate of fish substance frozen in the plastics bag is removed from the freezer tray and the frozen plate of fish substance is packed further in a carton packaging.

Block cartons are a type of packaging that is used for manual packaging of fresh foodstuffs prior to freezing, eg within the fish industry for freezing fish or fish products, cf eg WO 97/06064. Conventionally a block carton is manufactured in the form of a plane liner with pre-embossed folding lines that is converted to a packaging by being erected in a so-called freezing frame. Within the industry such liner is also known by the designation "fishblock liner", "sheet" or "blanket" and consists of a bottom panel with a front and rear side panel and two opposed, shorter end-side panels, also designated end panels, wherein the rear panel is connected to one side of a cover panel, and wherein the cover panel can be provided with one or more flaps along the remaining sides of the cover. In order to ensure the user optimal access to the open block carton, the cover is arranged on one of the side panels.

In order to ensure improved closure of the carton when it is erected in a freezing frame, the side panels can be provided with corner segments in the form of corner flaps attached to a single side panel, as described eg in WO 97/11890. Such closure of the corners protects against liquid seeping out of the erected carton, and likewise the contents are protected against damage (freeze burn) during the subsequent freezing procedure. Correspondingly the cover can be provided with side flaps.

It should be noted that it is important that the corner flaps and the side flaps of the cover are located on the outside of the carton since it is undesirable to have them frozen into the fish or correspondingly. This would mean that when the carton is removed from the frozen commodity, a part of the carton would more or less visibly remain in the commodity, which is undesirable for obvious reasons.

The work involved in erecting the block carton in the freezing frame is conventionally performed manually which means that the above-mentioned errors occur easily, in particular in view of the very elevated work rate at which this work is performed.

A variety of different solutions have been proposed to the problem of avoiding that portions of the block carton are frozen into the fish or the like.

Thus, WO 96/02422 teaches a block carton as described above that is provided with indicators on the liner corresponding to the outsides of the folded carton, said indicators becoming visible in case of erroneous closure of the block carton. It is a drawback in connection with this block carton that the visual inspection of the block carton cannot be performed until after discharge of the block from the square freezing frame, ie after the carton has been filled with fish or the like, closed and frozen. Erroneous closure of the block carton thus presupposes that the all of the fish is initially removed from the block carton, following which the fish needs to be thawed to enable a renewed filling operation. Thus, in case of erroneous closure of the block carton a heavy workload is involved in remedying this erroneous closure.

WO 97/11890 teaches a block carton as described above that is provided with indicators on the liner corresponding to the insides of the folded carton, said indicators becoming visible in case of erroneous closure of the corner flaps of the block carton. This type of indicators enables control of correct folding prior to filling of the carton.

A third option would be to use both of said indicator systems on the same liner, which would facilitate control during as well as after performing this work.

Conventionally a liner for a block carton consists of a cardboard blank coated on the one side with a coating intended to ensure that the foodstuff does not freeze onto the interior face of the block carton. Typically, the coating consists of a wax or paraffin product. In order to further ensure that the packaging is able to receive a part of the moisture emitted during the freezing process, the coating can be provided with a number of openings, typically a large number of small openings, also designated pin-holes that can have a maximum diameter of up to 3 mm, but they are typically smaller than 1 mm. Additionally these small openings have the effect that the food substance does not freeze onto the entire inside of the packaging, and therefore that they are readily released there from. For further controlling evaporation from the packaged foodstuff it is an option that, on its other side, the packaging is also provided with a coating, but such will typically not be provided with openings. For some types of block cartons a through-going coating is used for the interior face, to which coating an uneven surface has been imparted by embossing the cardboard with a given pattern.

In the light of this, it is the object of the present invention to provide a method whereby a more simple and inexpensive packing and freezing process can be obtained.

It is furthermore an object to further prevent the foodstuff from drying out or becoming rancid.

According to a first aspect and according to the present invention this is accomplished by a method that simplifies the known principles by enabling that the fish substance is frozen directly within the final packaging thereby enabling quicker and less expensive manufacture. More specifically, these advantages are obtained by the plate-formed, unfrozen food substance being, following shaping by extrusion, positioned directly on a bottom face of an erected carton packaging following which the cover panel of the carton packaging is closed over the bottom face such that the unfrozen plate of food substance is completely enclosed by the bottom face, cover panel and side panels of the carton packaging following which the carton packaging containing the unfrozen plate of food substance is arranged in a freezer with a view to freezing of the plate of food substance whereby the carton packaging is frozen onto the plate of food substance.

In order to ensure correct positioning of the unfrozen plate within the packaging the plate would expediently be "directed" down into the packaging. According to a preferred embodiment this is ensured in that the plate is shaped "longitudinally", ie that the plate is extruded with a width corresponding to the extrusion nozzle that is smaller than the length of the cut-off plate. In order to also ensure that the front end of the plate (ie most distant from the extruder) is not positioned on top of the end panel of the packaging but within same, the cover panel of the packaging is—in a preferred embodiment—arranged on one of the short side panels thereby enabling that the foodstuff plate is extruded towards an upright cover panel that thereby serves to ensure that the plate is positioned correctly within the packaging. The fact that the extrusion of the food substance is effected "longitudinally" also means that the production equipment (eg the extruder and a conveyor) can have relatively small dimensions, which is advantageous in confined spaces onboard a vessel.

Thus, it is hereby possible to provide carton-packaged blocks of fish substance or other food substance without an ensuing risk of the fish substance freezing onto the freezing faces of a freezer, and the packaging can be rendered less expensive and more simple in that only one single packaging process is required, and in that the previously used freezer trays and associated storage and maintenance thereof are rendered superfluous.

According to a preferred embodiment of the invention the plate of unfrozen food substance is formed by extrusion of the food substance through an extrusion nozzle directly down onto the packaging bottom, and subsequently cutting off the unfrozen string of food substance to form the finished, unfrozen plate of food substance.

The method according to the present invention can be further automated in that the carton packaging is transported on a conveyor at a given rate of conveyance, and in that the plate of unfrozen food substance is extruded at a rate that corresponds substantially to the rate of conveyance of the conveyor.

Particularly advantageously the carton packaging containing the unfrozen plate of food substance is frozen between two freezer plates that abut on a the bottom panel and cover panel of the carton packaging with a certain pressure. Thus, hereby an extremely expedient conduction of heat is accomplished from the food substance through the cover and bottom face of the carton packaging and to the freezer plates.

Further advantageously spacer elements can be provided between the freezer plates with a view to ensuring a minimum distance between the freezer plates during the freezing procedure whereby it is ensured that the finished, frozen, packaged plates of food substance have the same height.

In order to offer optimal protection of the foodstuff against drying-out, rancidity and "freeze burn", the packaging is—in a preferred embodiment—at least on the one side coated with a coating that prevents evaporation from the inside as well as access of oxygen from the outside. Today, this is not possible with the plastics bags of polyethylene that are conventionally used in the freezing procedure of Surimi or other extruded foodstuffs. Such improved protection of the foodstuff during freezing and storage increases the quality of the frozen foodstuff.

A further aspect of the invention relates to a carton packaging for use in the method according to the invention.

The carton packaging according to the invention comprises essentially rectangular bottom panel with four sides to which two opposed side panels and two opposed shorter end panels are connected, and a cover panel with four sides wherein the cover panel and the bottom panel are connected to each other via one of the short end panels. In order to ensure adequate functionality, the carton packaging is further provided with a coating on at least the one side. The term "the one side" is used to designate either the one side of the two sides of the plane, not yet erected liner, or the interior side of the erected carton packaging.

As opposed to the conventional block cartons that are intended for use in manual positioning of a foodstuff with ensuing positioning of the cover on the one of the two longer sides of the packaging, the block carton (or a liner for a block carton) according to the present invention is intended for use exclusively in connection with direct filling of a plate of food substance from an extrusion device. As described above this ensures easy and reliable positioning of the plate on the bottom face of the packaging.

According to preferred embodiments the packaging can be provided with corner flaps and indicators as described above.

The invention also relates to an apparatus for use in the method according to the invention, and wherein the apparatus according to the invention comprises a conveyor, said conveyor having a transport face that moves in the direction of conveyance of the conveyor, and wherein there is provided—at each side of the conveyor—elevations that extend in the longitudinal direction of the conveyor and above the transport face of the conveyor, said elevations being arranged at a distance from each other that corresponds to the short lateral length of the bottom panel of a carton packaging with a view to supporting the side panels of the carton packaging at a right angle relative to the bottom panel of the carton packaging. Hereby it is obtained that the unfrozen food substance positioned on the bottom panel of the carton packaging is covered as quickly as possible by side faces on the carton packaging.

This advantage is further enhanced if the conveyor has, on its transport face, drivers that extend from the transport face with a view to supporting a short side panel on the carton packaging.

The invention will now be described in further detail with reference to the drawing, wherein:

BRIEF DESCRIPTION OF THE DRAWINGS

FIG. 1 is an explanatory sketch of an apparatus for packaging and freezing food substance. Thus, the apparatus comprises an extruder of which FIG. 1 shows only the front portion of the extruder nozzle of the extruder 1 from which plate 2 of food substance of a substantially rectangular cross section is extruded. At the extruder nozzle 1 a cutter mechanism 3 is provided with a view to cutting off the extruded food substance 2 in suitable lengths.

Figure 1:
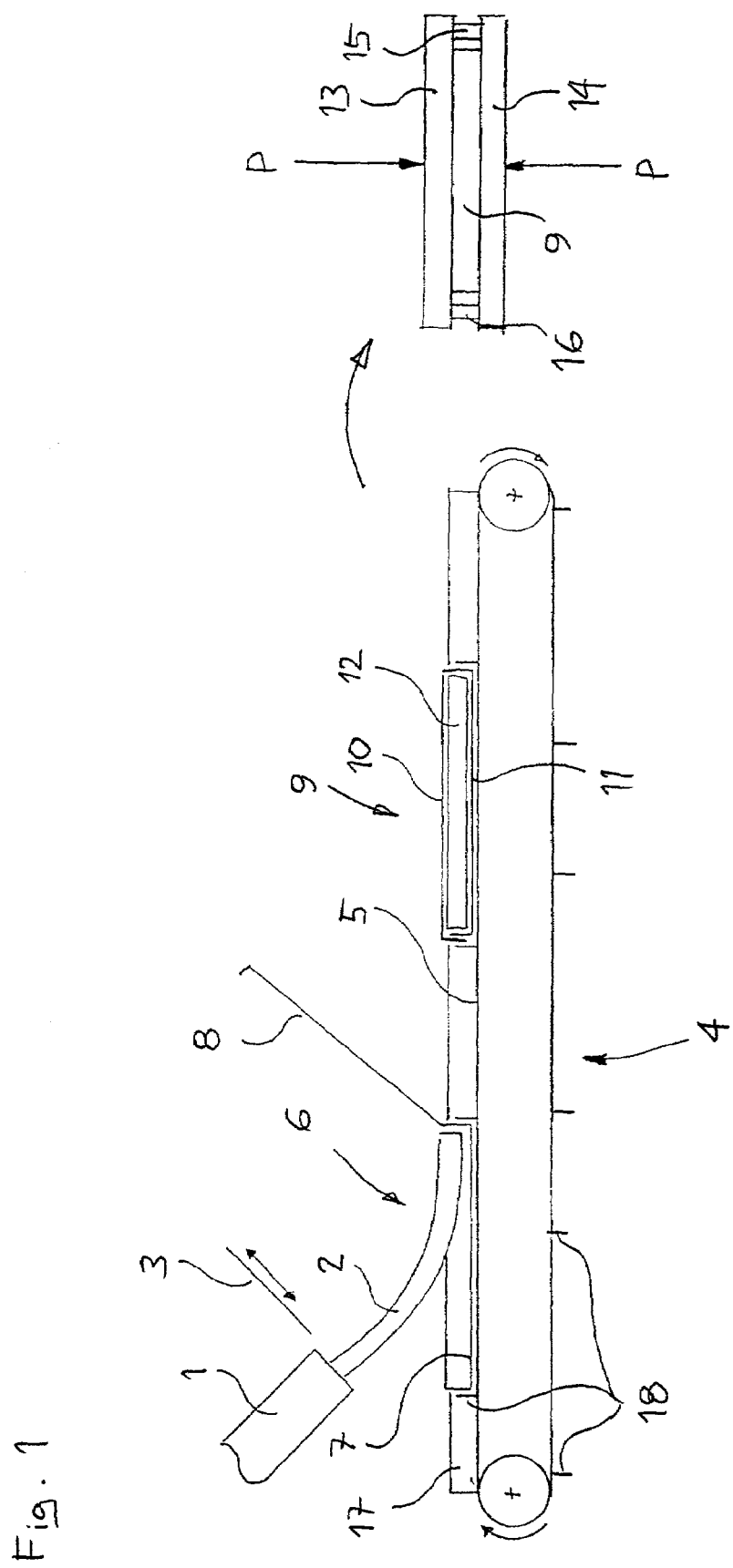
FIG. 1 is an explanatory sketch that illustrates the method and the principles of the construction of an apparatus for use in connection with the invention.

Underneath the extruder nozzle 1 a conveyor 4 is arranged which is configured herein as a conveyor belt 5 on which a first carton packaging 6 is arranged that has a bottom portion 7 and a cover portion 8. As will appear the cover portion 8 in the first carton packaging 6 is open, and in the shown position the food substance 2 is extruded down into the first carton packaging 6 that comprises erected short and long side panels where the side panel that faces towards the viewer is not shown for the sake of overview.

As will appear from the figure, the food substance is extruded in a direction towards the upright cover panel 8 of the packaging thereby preventing that the front end of the plate (ie most distant from the extruder) is not positioned on top of or outside the end panel of the packaging, but within this. In the event that the food substance is positioned in part on the inside of the cover panel, this part of the food substance is pressed down into the packaging when the cover is closed. Since completely correct positioning of the food substance is thus not necessary this arrangement enables filling of the packaging at a higher rate. In the figure, the packaging is shown without side panels towards the viewer.

The carton packaging is subsequently transported a further distance and will, at a later stage, occupy the position occupied by the other carton packaging 9. Here the cover 10 of the carton packaging 9 has be closed across the bottom portion 11 such that the amount of food substance 12 positioned in the other carton packaging is enclosed by the carton packaging 9.

The filled carton packaging 9 is subsequently transferred to a plate freezer that, in principle, comprises at least two freezer plates 13,14 that press against the cover and bottom portion of the carton packaging 9 whereby the non-frozen contents of the carton packaging 9 are frozen to a solid block. According to a preferred embodiment of the invention, the plate freezer is provided with spacer elements 15,16 that ensure a uniform distance between the freezer plates 13,14 whereby an even thickness is imparted to the ready-packaged food product. The two freezer plates abut with a given pressure P on the bottom panel and cover panel of the carton packaging.

When the food substance plate is frozen, it will normally expand and therefore it is necessary to take this into account when selecting the dimensions of the plate of food substance such that the cross section of the unfrozen plate is smaller than the cross section of the packaging perpendicular to its longitudinal axis. On the other hand it is also important that the ready-frozen food substance comes into contact with the side panels of the packaging. With this as a starting point, the final choice of dimensions for the plate of unfrozen food substance is a choice that must be made by the person skilled in the art in accordance with the circumstances, eg the type of food product, the size of the packaging and the freezing conditions.

The conveyor 4 features lateral elevations 17 that extend in the longitudinal direction of the conveyor belt 5, and drivers 18 are configured on the transport face of the conveyor belt 5, said side elevations 17 and drivers 18 being arranged such that side panels on the carton packagings 6,9 are kept perpendicular to the bottom panel 7,11 of the carton packaging. Hereby adequate, mutual positioning of the carton packaging 6,9 and the food substance 2,12 is ensured. To facilitate overview, the side elevations facing towards the viewer are not shown.

Instead of a conveyor with elevations and drivers, individual freezing frames can be used such that the carton packaging are first erected in a freezing frame, following which the food substance is extruded down into the erected packaging. Advantageously the freezing frames are arranged and charged onto a conveyor that is preferably configured for advancing the freezing frames at a velocity that corresponds to the extrusion rate of the food substance.

As described with reference to FIG. 1, the cover 8 is arranged on one of the short side panels of the packaging.

Figure 2:
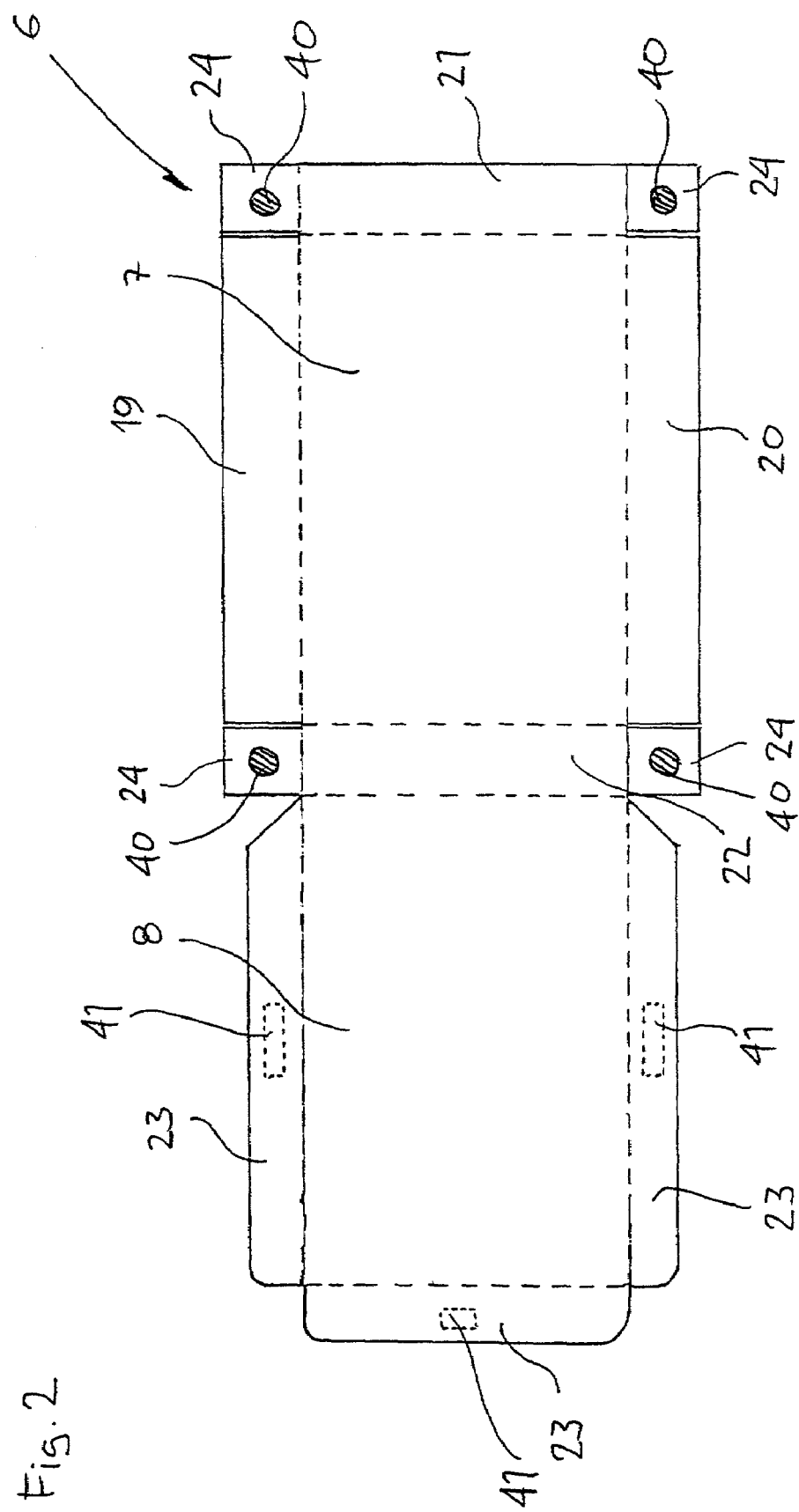
FIG. 2 is a drawing that illustrates a preferred embodiment of a carton packaging for use in the method according to the invention.

Now FIG. 2 illustrates an advantageous embodiment of a carton packaging 6 for use in the method according to the present invention.

As will appear the carton packaging 6 is shown as a planar blank that comprises a substantially rectangular bottom panel 7 for which the long side edges are provided with long side panels 19,20, and the short side edges are provided with short side panels 21,22. At the side edges the bottom panel 7 is provided with embossed lines (indicated by dotted lines in the figure), said embossed lines separating the bottom panel 7 from the side panels 19,20,21,22, and corner flaps 24 are attached at the ends of the short side panels via embossed lines.

When the bottom panel 7 on the carton packaging 6 is positioning on the conveyor belt 5 as shown in FIG. 1, the long side panels 19,20 will thus abut on the elevations 17 and extend perpendicularly from the bottom panel 7, and the same will apply to the short side panels 21,22 that are, on the conveyor belt, supported by the drivers 18 on the conveyor belt 5. When the packaging is erected by means of a freezing frame the side panels will, in a corresponding manner, abut on the interior faces of the freezing frames.

According to the invention, the cover 8 is positioned on the one of the short side panels 22 (separated by embossing lines), and as shown the cover 8 has the same length and width as the bottom panel 7. Hereby the cover 8 can tilt across the bottom panel 7 and thus cover it completely. In order to ensure the tightest possible packaging the cover is, as shown, provided with side flaps 23 that are attached to the cover 8 via embossing lines (shown with dotted line). Correspondingly the cover is, as shown, provided with side flaps 23 that are attached to the cover 8 via embossed lines (shown with dotted line).

As described above the liner can be provided with indicators that enable a control whether the block carton has been erected or folded correctly. FIG. 2 shows a liner seen from the topside, ie the side that faces inwards/upwards in the erected block carton. The liner is provided with indicators 40 on the internal side of the corner flaps 24. Since the corner flaps are, in the correctly erected block carton, to be located on the outside of the side panels, non-visible indicators 40 will show that the carton is erected correctly.

Correspondingly it will be possible to provide the side panels with indicator (not shown) corresponding to the areas that are covered by the corner flaps 24 when the carton is erected. In that case the absence of an indicator will indicate that the corner flap is located on the wrong, interior side of the side panel. Additionally, the liner is on the opposite side (ie the underside) provided with indicators (41) shown with dotted line) on the side flaps 23. When the cover is closed correctly, the side flaps are located on the outside of the closed packaging and it follows that the indicators 41 are visible. Instead of the corner flaps, the side panels can be provided with indicators (not shown) that are covered when the cover is closed correctly. Typically, the indicators are coloured, printed indicators that enable swift and reliable visual control.

The invention claimed is:

1. A method of packaging and freezing food substance, comprising the steps of:
   extruding a plate of unfrozen food substance by an extrusion nozzle and a cutter mechanism;
   packaging the unfrozen plate of food substance in a carton packaging;

wherein the carton packaging comprises a substantially rectangular bottom panel with two opposed, erected, long side panels, and two opposed, erected, short end panels and a substantially rectangular cover panel;

wherein the unfrozen plate of the food substance is extruded having a width corresponding to the extrusion nozzle, the width being smaller than a length of the unfrozen plate, wherein the extruding occurs when the cover panel is turned away from the bottom panel, such that the cover panel and the bottom panel are connected to each other via one of the short end panels;

wherein a first extruded front end of the unfrozen plate of food is introduced onto the bottom panel in a manner whereby the front end of the unfrozen plate of food is located closer to the one short end panel that connects the cover panel to the bottom panel when the cover panel is turned away than to the opposite short end panel;

following which the cover panel of the carton packaging is closed to cover the bottom panel such that the unfrozen plate of food substance is completely enclosed by the bottom panel, cover panel and side panels of the carton packaging; and following which the carton packaging containing the unfrozen plate of food substance is positioned in a freezer to freeze the plate of food substance, whereby the carton packaging is frozen completely on the plate of food substance.

2. A method according to claim 1, wherein the carton packaging is transported on a conveyor at a given advancement rate, wherein the plate of unfrozen food substance is formed by initially extruding the food substance through an extruder nozzle with a flow rate of food substance through the extruder nozzle that corresponds essentially to the advancement rate of the conveyor, and wherein the unfrozen, extruded food substance is subsequently cut off to form the finished unfrozen plate of food substance.

3. A method according to claim 2, wherein the food substance is extruded directly into the carton packaging.

4. A method according to claim 1, wherein the carton packaging containing the unfrozen plate of food substance is frozen between two freezer plates that abut with a given pressure on the bottom panel and cover panel of the carton packaging.

5. A method according to claim 2, wherein the conveyor is provided with devices that keep the side panels attached to the bottom panel essentially perpendicular to the bottom panel while the carton packaging is transported on the conveyor and charged with the unfrozen plate of food substance.

6. A method according to claim 2, wherein the packaging is positioned in a freezer frame that that keep the side panels attached to the bottom panel essentially perpendicular to the bottom panel while the carton packaging is transported on the conveyor and charged with the unfrozen plate of food substance.

* * * * *